United States Patent
Peters, Jr. et al.

(10) Patent No.: US 8,165,113 B1
(45) Date of Patent: Apr. 24, 2012

(54) SESSION INITIATION PROTOCOL (SIP) MESSAGE INCORPORATING A NUMBER OF PREDETERMINED ADDRESS HEADERS HAVING PREDETERMINED ADDRESS INFORMATION

(75) Inventors: Robert Yaeger Peters, Jr., Rumson, NJ (US); Harish Samarasinghe, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 829 days.

(21) Appl. No.: 10/354,371

(22) Filed: Jan. 30, 2003

(51) Int. Cl.
*H04L 12/28* (2006.01)

(52) U.S. Cl. ........................................................ 370/389

(58) Field of Classification Search .......... 370/389–427, 370/474, 475; 379/93.01, 93.03, 93.09, 142.13, 379/142.14, 219, 220.01, 221.14, 225, 229–234
See application file for complete search history.

(56) References Cited

U.S. PATENT DOCUMENTS

| | | | |
|---|---|---|---|
| 6,038,230 A | 3/2000 | Ofek | |
| 6,161,134 A | 12/2000 | Wang et al. | |
| 6,240,391 B1 | 5/2001 | Ball et al. | |
| 6,259,691 B1 | 7/2001 | Naudus | |
| 6,272,131 B1 | 8/2001 | Ofek | |
| 6,272,132 B1 | 8/2001 | Ofek et al. | |
| 6,330,236 B1 | 12/2001 | Ofek et al. | |
| 6,377,579 B1 | 4/2002 | Ofek | |
| 6,421,674 B1 | 7/2002 | Yoakum et al. | |
| 6,434,143 B1 | 8/2002 | Donovan | |
| 6,438,555 B1 | 8/2002 | Orton | |
| 6,446,127 B1 | 9/2002 | Schuster et al. | |
| 6,477,150 B1 | 11/2002 | Maggenti et al. | |
| 6,480,588 B1 | 11/2002 | Donovan | |
| 6,483,600 B1 | 11/2002 | Schuster et al. | |
| 7,058,068 B2 * | 6/2006 | Gawargy et al. | 370/410 |
| 2002/0141358 A1 * | 10/2002 | Requena | 370/329 |
| 2003/0046405 A1 * | 3/2003 | O'Neill et al. | 709/228 |
| 2003/0110292 A1 * | 6/2003 | Takeda et al. | 709/245 |
| 2003/0179712 A1 * | 9/2003 | Kobayashi et al. | 370/249 |
| 2003/0217165 A1 * | 11/2003 | Buch et al. | 709/229 |
| 2004/0205209 A1 * | 10/2004 | Wengrovitz et al. | 709/230 |
| 2008/0184286 A1 * | 7/2008 | Kwoh et al. | 725/32 |
| 2010/0275230 A1 * | 10/2010 | Yuen et al. | 725/43 |

OTHER PUBLICATIONS

Newton's Telecom Dictionary, Jan. 1998, p. 57-58.*

* cited by examiner

*Primary Examiner* — Kwang B Yao
*Assistant Examiner* — Tung Q Tran

(57) ABSTRACT

A Session Initiation Protocol (SIP) message adapted for communication between a plurality of network elements located on a multi-media services provider system to form a multi-media communication path between at least a first communication device and at least a second communication device of a plurality of communication devices. The SIP message includes a header region and a plurality of header fields located on the header region. The plurality of header fields include predetermined address information associated with at least one network element of the plurality of network elements located on the multi-media services provider system.

15 Claims, 2 Drawing Sheets

SESSION INITIATION PROTOCOL (SIP) MESSAGE INCORPORATING A NUMBER OF PREDETERMINED ADDRESS HEADERS HAVING PREDETERMINED ADDRESS INFORMATION

FIELD OF THE INVENTION

The present invention relates generally to a SIP INVITE message adapted to efficiently communicate information between a number of network elements of a communication system, and more specifically, to a SIP INVITE message which includes a number of header fields having predetermined addressing information associated with the network elements that permits efficient parsing and/or processing of the SIP INVITE message.

BACKGROUND

Presently, SIP is becoming an increasingly popular protocol for transporting both standard and non-standard information in a common framework over Local Area Networks (LANs). For example, LANs can include SIP-based multi-media service provider systems, such as systems and services provided by AT&T. However, Wide Area Networks (WANs) provided by other various communications service providers continue to employ a mixture of call signaling protocols, such as H.323, Media Gateway Control Protocol (MGCP), Hyper Text Transfer Protocol (HTTP) and proprietary protocols, which are used for communicating information between various components of the WAN. However, each multi-media communication service provider system operating on a LAN is required to interface with the WAN in order to communicate information over the WAN to SIP-enabled communication devices.

Furthermore, as SIP-based multi-media communication service provider systems operating on LANs continue to offer additional services, there is a need to improve the rate for which requests for multi-media services are processed. Typically, SIP protocol specific messages, such as SIP INVITE messages and SIP Redirect messages, are employed to communicate information related to requests for multi-media services between the various components of the SIP-based multi-media services provider system. However, the present format of SIP protocol messages require appreciable parsing and/or processing by a recipient network element in order to extract pertinent addressing information, which is used by the recipient network element to generate and send another SIP protocol message having predetermined information to a destination network element for processing the request for the multi-media services.

Therefore, an unsolved need remains for a SIP protocol message, such as a SIP INVITE message and/or a SIP Redirect message, which employs a format that reduces processing overhead of a recipient network element for parsing and/or processing the SIP protocol message in order to extract pertinent addressing information. Further, an unsolved need remains for a SIP protocol message that is directly compatible with other various network elements operating on the WAN.

SUMMARY OF THE INVENTION

A SIP message is set forth in accordance with the present invention, which is adapted for communication between a plurality of network elements to form a multi-media communication path between at least a first communication device and at least a second communication device of a plurality of communication devices. The SIP message includes a header region having a plurality of header fields. The plurality of header fields include predetermined address information associated with at least one network element of the plurality of network elements.

In one aspect, the plurality of header fields include at least a To: header field having at least a Collected Address header parameter. The To: header field further includes at least a Collected Address-Nature of Number header parameter, a Collected Address-Numbering Plan header parameter, a Carrier Identifier Code header parameter, a Carrier Selection header parameter and a Nature of Carrier header parameter.

In another aspect, the plurality of header fields further includes at least a From: header field having at least a Charge Number header parameter. The From header field further includes at least a Charge Number-Nature of Number header parameter, a Charge Number-Numbering Plan header parameter and a Calling Party Station Type header parameter.

In another aspect, a SIP message is set forth in accordance with the present invention, which is adapted to communicate information between a plurality of network elements located on a multi-media services provider system to form a multi-media communication path between at least a first communication device and at least a second communication device of a plurality of communication devices. The SIP message includes a header region having a plurality of header fields. The plurality of header fields include predetermined address information associated with at least one network element of the plurality of network elements located on the multi-media services provider system.

BRIEF DESCRIPTION OF THE DRAWING

The foregoing and other objects of this invention, the various features thereof, as well as the invention itself, can be more fully understood from the following description, when read together with the accompanying drawings in which.

DETAILED DESCRIPTION OF THE INVENTION

In accordance with principles of the present invention, set forth is an INVITE message having predetermined content and format, which is adapted for communicating information between various elements of a communications system, such as the multi-media services provider system 10a, as described below in connection with FIGS. 1 and 2. The INVITE message is further adapted to communicate information between the multi-media services provider system 10a and other various external network devices. The INVITE message generally includes a number of header fields having a plurality of address related information for permitting a recipient network element to efficiently parse and/or process the INVITE message to provide multi-media services to the first 22a and/or second 22b communication devices.

Figure 1:
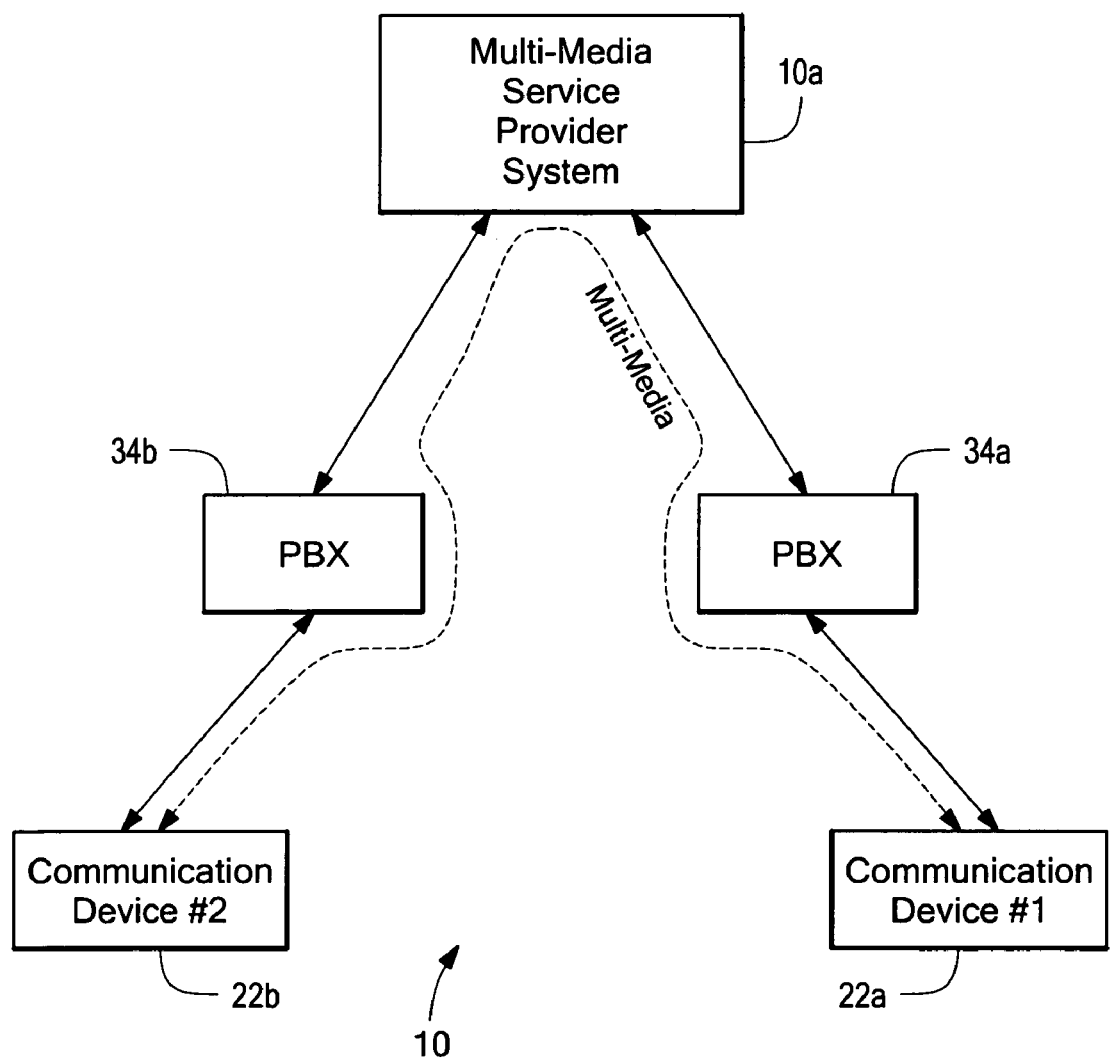
FIG. 1 is an exemplary high-level schematic block diagram of a system for providing multi-media communications between a plurality of communication devices according to the present invention.

Referring to FIG. 1, shown is one embodiment of a communication network 10 for providing multi-media communications between at least first 22a and second 22b communication devices of a plurality of communication devices, in accordance with the present invention. The communication network 10 includes a multi-media provider system 10a, which is operative to provide a plurality of multi-media services to the first 22a and second 22b communication devices, via respective first 34a and second 34b SIP-enabled IP-Private Branch Exchanges (hereinafter referred to as "PBXs"). It should be understood that the multi-media services provider system 10a is additionally operative to provide a plurality of multi-media services to a plurality of other communication devices not specifically shown herein.

Figure 2:
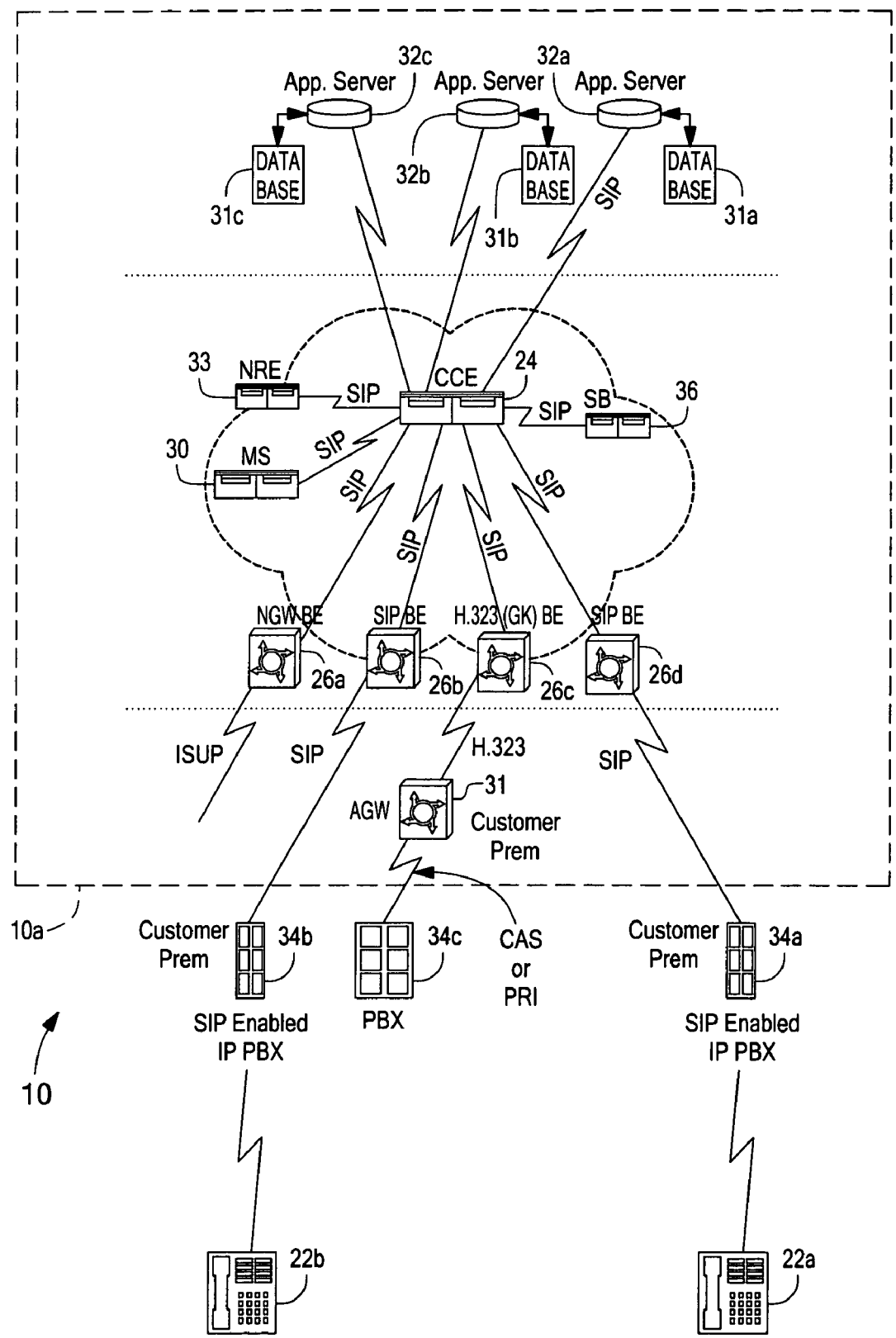
FIG. 2 is an expanded schematic block diagram of the system shown in FIG. 1.

Referring to FIG. 2, in the exemplary embodiment, the multi-media services provider system 10a includes a centrally located Call Control Element 24 (CCE), a Media Server (MS) 30, a plurality of Application Servers (ASs) 32a, 32b, 32c (collectively referred to hereinafter as ASs 32a-32b) at least one Network Routing Engine (NRE) 33, at least one Service Broker (SB) 36 and a plurality of Border Elements (BEs) 26a, 26b, 26c, 26d (collectively referred to hereinafter as BEs 26a-26d). The CCE 24 is coupled to the plurality of ASs 32a-32c, to the plurality of BEs 26a-26d and to the MS 30. The CCE is further coupled to the NRE 33 and to the SB 36.

In the exemplary embodiment, the fourth BE 26d is coupled to the first PBX 34a and the second BE 26b is coupled to the second PBX 34b. Further, the third BE 26c is coupled to PBX 34c, via an access gateway 31, and is adapted for operation using the H.323 protocol. It should be understood that the BEs 26a-26d can be coupled to a plurality of other PBXs (not shown), which are included in other embodiments not specifically shown herein.

In the exemplary embodiment, the first PBX 34a is coupled to the first communication device 22a. Further, the second PBX 34b is similarly coupled to the second communication device 22b.

The CCE 24, for example, can be provided by Lucent Corporation of Murray Hill, N.J. The CCE 24 may be defined as a back-to-back user agent (B2BUA), which operates to receive a plurality of INVITE messages from any one of the plurality of BEs 26a-26d and upon receipt of the plurality of INVITE messages from the plurality of BEs 26a-26d, the CCE 24 can initiate an equal plurality of INVITE messages to the SB 36. The CCE 24 is further adapted to receive a plurality of Redirect messages from the SB 36 in response to the plurality of INVITE messages sent to the SB 36 from the CCE 24. When the CCE 24 receives a Redirect message back from the SB 36 in response to an INVITE message and depending on instructions provided by the SB 36 in the Redirect message, the CCE 24 can either send an INVITE message to one or more of the plurality of ASs 32a-32c for feature processing for the call or the CCE 24 can send an INVITE message to the NRE 33 (i.e. feature processing is not required for the call) to bypass the plurality of ASs 32a-32c and set up the call. The CCE 24 is further adapted to maintain the call state between the first 22a and the second 22b communication devices and to generate a call detail record (CDR) based on instructions received from any one or more of the plurality of ASs 32a-32c.

The CCE 24 is also adapted to use "Third Party Call Control," which is described in the reference, "Third Party Call Control in SIP" by Rosenberg, Peterson, Schulzrinne, Camarillo, RFC-Draft, Internet Engineering Task Force, Mar. 2, 2001," which is herein incorporated by reference. The Third Party Call Control feature of the CCE 24, permits the CCE 24 to create a call in which communication is actually between other parties. For example, an operator can use Third Party Call Control to create a call that connects two participants together or similarly, the CCE 24 can use Third Party Call Control to connect the MS 30 and the first communication device 22a. Generally, Third Party Call control allows the CCE 24 to connect the various end callers without having the media stream pass through the CCE 24 and yet, the CCE 24 can still maintain call state information.

In the exemplary embodiment, the plurality of BEs 26a-26d can be provided by Lucent Corporation of Murray Hill, N.J. In one embodiment, the plurality of BEs 26a-26d are adapted to use SIP as the signaling protocol for interfacing with the CCE 24. Further the first BE 26a is adapted to interface to a circuit network (not shown) using an ISDN user port included thereon. The second BEs 26b and the fourth 26d are adapted to use SIP as the signaling protocol for interfacing with the first 34a and second 34b PBXs. The third BE 26c is adapted to use H.323 as the signaling protocol for interfacing with the PBX 34c, via the Access Gateway (AGW) 31. In the exemplary embodiment, the plurality of BEs 26a-26d may be thought of as a SIP B2BUA because each of the BEs 26a-26d generates SIP messages as well as receives requests from SIP endpoints, such as the SIP-enabled first 34a and second 34b PBXs, and either processes the requests itself or forwards the requests to the CCE 24 for processing.

In the exemplary embodiment, the SB 36 can also be provided by Lucent Corporation of Murray Hill, N.J. In one embodiment, the SB 36 acts as the SIP Redirect Server. The SB 36 operates to identify a particular service request, which is included in the INVITE message received at the SB 36 from the CCE 24. The SB further operates to instruct the CCE 24, via a Redirect message, to redirect the call to one or more of the plurality of ASs 32a-32c for service processing. In an embodiment, the SB 36 can identify a particular service requested by the call based on ANI or DN information included in the INVITE message received at the SB 36 from the CCE 24. In addition, the SB 36 may perform call screening based on the Charge Party Station Type (a.k.a. OLI— Originating Line Information) received in the INVITE message at the SB 36.

After the SB 36 determines which of the first AS 32a, second AS 32b or third AS 32c as the primary and secondary processors for processing a particular call request, the SB 36 generates a SIP Redirect "300 Multiple Choice" message and populates the IP address/Port number combinations of the (primary/secondary) AS 32a, 32b or 32c in the Contact headers of the "300 Multiple Choice" message, and sends it to the CCE 24. This approach permits the CCE 24 to query the secondary AS 32a, 32b or 32c in the event that the primary AS 32a, 32b or 32c is overloaded or not available to process the call request. If the SB 36 does not find a ANI or Dialed number match in the INVITE message received from the CCE 24, but has a carrier other than the multi-media service provider system 10a (e.g. AT&T), the SB 36 may send another SIP Redirect "300 Multiple Choice" to the CCE 24 with the IP address of the NRE 33 indicating that the call request does not require AS 32a-32c processing, which effectively bypasses any service processing at the plurality of ASs 32a-32c.

In the exemplary embodiment, the plurality of ASs 32a-32c can each include a conventional computer server, such as an "NT-Server," which can be provided by Microsoft of Richmond, Wash. or a "Unix Solaris Server," which can be provided by Sun Micro Systems of Palo Alto, Calif. The ASs 32a-32c can be programmed with conventional Web-page interface software such as: "Visual Basic," "Java," "JavaScript," "HTML/DHTML," "C++," "J+," "Perl," or "Perlscript," and "ASP." The ASs 32a-32c can each further be programmed with an operating system, Web server software and Web Application software, such as an e-commerce application and computer network interface software.

In addition, the ASs 32a-32c contain the intelligence needed for offering multimedia services such as Toll-Free Calling or 800-Service, Virtual Private Networks, and various multimedia features like email, "Click-To-Dial." The intelligence may be comprised of customer logic and data, as well as, common logic and data that are used by all customers. It is necessary for the CCE 24 to access the logic and data in the ASs 32*a*-32*c* in order to provide the multi-media services or features.

The ASs 32*a*-32*c* can each be further respectively coupled to databases 31*a*-31*c*, which each contain a service intelligence layer adapted for providing the plurality of multi-media services described above. The intelligence layer may include customer logic and data, as well as common logic and data that is used by communication devices 22*a*, 22*b*, as well as a plurality of other communication devices not specifically shown in FIG. 2.

The NRE 33 also operates as a SIP Redirect Server. The NRE 33 processes INVITE messages received from the CCE 24; performs address resolution based on the routing number returned from the AS 32*a*-32*c* and generates a Redirect "300 Multiple Choice" message. The NRE 33 populates Redirect 300 Multiple Choice message with the IP addresses of one or more destination BEs 26*a*-26*d* and sends the Redirect 300 Multiple Choice message to the CCE 24. In an embodiment, the NRE 33 can send the Redirect 300 Multiple Choice message to the CCE 24 with a predetermined hierarchical list of IP addresses corresponding to a predetermined hierarchical order of BEs 26*a*-26*d* for processing the call. In this arrangement, a highest level BE 26*a*, 26*b*, 26*c* or 26*d* defined on the list can receive and process the call and if the highest level BE 26*a*, 26*b*, 26*c* or 26*d* is unable to process the call or has insufficient resources to do so, the call may be redirected by the CCE 24 to a next successive BE 26*a*, 26*b*, 26*c* or 26*d* defined on the hierarchical list.

The first 22*a* and second 22*b* communication devices can include a plurality of SIP-enabled devices, such as telephones, personal computers and IP-Private Branch Exchanges ("PBXs"). In addition, the first 22*a* and second 22*b* communication devices can include a plurality of SIP-enabled wireless devices, such as cellular telephones, pagers and personal digital assistants ("PDAs").

The MS 30 of the exemplary embodiment, is constructed and arranged to provide a plurality of predetermined announcements to the communication devices 22*a*, 22*b* and to collect information from the communication devices 22*a*, 22*b* (e.g. caller-entered data). For example, if the caller is required to enter digits or a phrase for a Call Prompter service or SDN (Software Defined Network) service, the MS 30 will play the announcement prompting the caller to enter the required information. The MS 30 also collects the information entered by the caller. The MS 30 plays the announcements to the caller based on the instructions and announcement ID provided in the second INVITE message. In one embodiment, the announcements can include "Service Terminating" announcements or announcements for the caller to enter an authorization code, account code, or "call-prompter" digits.

In an exemplary embodiment, the MS 30 can be defined as a VoiceXML based MS 30. The MS 30 provides various announcements and collects various information from callers operating from communication devices 22*a* or 22*b* when features requiring caller interaction are required to complete a call. For example, if the caller must enter digits or a phrase for a Call Prompter service or SDN service, which can be provided by the multi-media services provider system 10*a*, the MS 30 will play the announcement prompting the caller to enter the required information. The MS 30 further collects the information entered by the caller, which is defined herein as "caller-entered data."

As described above, the CCE 24 is adapted to receive a call request or INVITE message from the first 22*a* and/or second 22*b* communication devices, which requests multi-media services. In response, the CCE 24 can communicate with any one or more of the SB 36, the plurality of application servers 32*a*-32*c*, the NRE 33 and/or the plurality of BEs 26*a*-26*d* using a number of predetermined INVITE messages.

In one preferred exemplary embodiment, the predetermined INVITE message can include the following information:

INVITE   sip:7324204734@sdnas.att.com;user=phone SIP/2.0
Via: SIP/2.0/UDP att.com:5060
Max-Forwards: 70
From:   sip:7324204699@att.com;   cn=7324201000; cn-non=3; cn-np=1; cpst=32
To:   <sip:7324204734@att.com>;   ca=7324204734; ca-non=3; ca-np=1; cic=288; cs=1; noc=0
Call-ID: c3904563-3119a-2995c 2e322238@att.com
CSeq: 100 INVITE
Accept: application/vnd.att-advanced-intelligent-services
Contact: sip:7324204699@att.com:5060
Content-Length: 0 where the above-described "From:" header field includes the header parameters: cn, cn-non, cn-np, and cpst; and where the above-described "To:" header field includes the header parameters: ca, ca-non, ca-np, cic, and cs, which are all defined below in the following table along with additional header parameters.

| Field | Name |
| --- | --- |
| cn | Charge Number (digits) |
| cn-non | Charge Number, Nature of Number |
| cn-np | Charge Number, Numbering Plan |
| ca | Collected Address (i.e. digits of dialed number) |
| ca-non | Collected Address, Nature of Number |
| ca-np | Collected Address, Numbering Plan |
| cpn | Calling Party Number |
| cpn-non | Calling Party Number, Nature of Number |
| cpn-np | Calling Party Number, Numbering Plan |
| cpn-pri | Calling Party Number, Privacy Restriction Indicator |
| cpn-si | Calling Party Number, Screening Indicator |
| cic | Carrier (digits) |
| cs | Carrier Selection |
| noc | Nature of Carrier |
| cpst | Charge Party Station Type |

In alternate exemplary embodiment, the predetermined INVITE message can include the following information:

INVITE   sip:7324204734@sdnas.att.com;user=phone SIP/2.0
Via: SIP/2.0/UDP ccenj.att.com:5060
Max-Forwards: 20
From: sip:7324204699@att.com
To: <sip:7324204734@att.com>
Call-ID: c39h4563-d119a-2995c 2e322238@att.com
CSeq: 100 INVITE
Accept: application/vnd.att-advanced-intelligent-services
Contact: sip:7324204699@mypc.att.com:5060
Content-Type:   application/vnd.att-advanced-intelligent-services; boundary="- -att advanced services- -"
Content-Disposition: session
Content-Length: nnn
- -att advanced services BEID=be.mtnj.1234
CN=7324204699;3;1
L=222
C=0288;0
CPN=7324204699;3;1;0;3
CPST=3
CA=7324204734;3;1
- -att advanced services- -
where, the media type parameters of the INVITE message include:
Media Type name: application
Media Subtype name: advanced-intelligence-features
Required parameters: none
Optional parameters: none
Encoding scheme: US-ASCII In the preferred exemplary embodiment of the predetermined INVITE message, the "From:" and the "To:" header fields are located in a header region of the INVITE message, as opposed to a body portion of the INVITE message (which is shown in the alternate exemplary embodiment). In this arrangement, a recipient network device can rapidly parse and/or process the INVITE message to read pertinent addressing information contained in the header region of the INVITE message without having to also open and parse and/or process the body portion of the INVITE message to read the pertinent addressing information.

The header parameters of the "To:" header field (e.g. ca, ca-non, ca-np, cic, and cs) and the header parameters of the "From:" header field (e.g. cn, en-non, cn-np, and cpst) of the INVITE message follow a name value pair convention. This allows the header parameters of the "To:" and "From:" header fields to be placed in any order in the header region of the INVITE message. A number of the header parameters follow a format that closely resembles a format used by the American National Standards Institute (ANSI) signaling standards. This facilitates inter-working between the SIP-based multimedia services provider system 10a and other ANSI-based circuit networks (not shown). In addition, using this format facilitates the transition of information between network elements and support systems that are based on ANSI-based standards.

The Charge Number (e.g. cn) header parameter contains the charge number of the calling or originating party and other associated header parameters, such as the Nature of Number (e.g. cn-non) and the Numbering Plan (cn-np). In this exemplary embodiment, the Charge Number header parameter is positioned after the Uniform Resource Identifier (URI) in the "From:" header field of the INVITE message. It follows the SIP-Digits format, which closely resembles the format used by ANSI signaling standards. This facilitates inter-working between the SIP-based IP network and the ANSI-based circuit network.

The CCE 24 is adapted to receive and process a number of incoming INVITE messages, which are received from various elements of the multi-media provider system 10a or from other devices and/or network elements. For example, the CCE 24 can receive an INVITE message from any one of the plurality of BEs 26a-26d. The CCE 24 is also adapted to process the number of INVITE messages received from the plurality of BEs 26a-26d, as described above, to generate a number outgoing INVITE messages. The number of outgoing INVITE messages can be communicated from the CCE 24 to any one or more of a number of network elements, such as the SB 36, the MS 30, the plurality of ASs 32a-32c and/or the NRE 33.

When the CCE 24 receives an incoming INVITE message from a SIP/H.323 BE, such as the third BE 26c, the CCE 24 populates the Charge Number header parameter in the outgoing INVITE message with the Charge Number provisioned in the CCE 24 for the originating facility. When the CCE 24 receives an incoming INVITE message from a Network Gateway BE, such as the first BE 26a, the CCE 24 uses the Charge Number parameter from the Multipurpose Internet Mail Extensions (MIME) encoded SIP-Telophony (SIP-T) message to populate the Charge Number header parameter for an outgoing INVITE message, which is generated by the CCE 24. If the CCE 24 receives a Redirect message from one or more of the ASs 32a, 32b or 32c, and the CCE 24 determines that the content of the Redirect message should be communicated to the NRE 33, the CCE 24 sends the Charge Number header parameter in an outgoing INVITE message to the NRE 33, which outgoing INVITE message is generated by the CCE 24.

If the CCE 24 receives a Redirect message from the NRE 33 and the CCE 24 determines that the content of the Redirect message should be communicated to the third BE 26c, for example, the CCE 24 operates to generate an outgoing INVITE message with the Charge Number parameter removed. The CCE 24 removes the Charge Number header parameter from the outgoing INVITE message, which is sent to the third BE 26c, because the Change Number is used only in the service provider's network.

If any one of the plurality of ASs 32a, 32b or 32c receives an INVITE message from the CCE 24, which includes the Charge Number header parameter, the AS 32a, 32b or 32c will map the value in the Charge Number header parameter to a pre-defined variable (e.g. a system variable used by the application logic) for the Charge Number. This includes mapping the Nature of Number and Numbering Plan Type header parameters to the related pre-defined variable for the Charge Number header parameter.

The Carrier Identifier Code (e.g. CIC) is a header parameter located in the To: header after the Collected Address (ca) header parameter and contains the Carrier of the session. The Carrier Identifier Code may be defined as the input entered by the Calling or Originating Party; or the Carrier Identifier Code may be predefined and set by the network elements such as the CCE 24 or the AS 32a, 32b or 32c.

The Carrier Identifier Code header parameter can include the following information and/or format:
Carrier Selection (cs):
0=No indication
1=Selected carrier identification code pre-subscribed and not input by calling party
2=Selected carrier identification code pre-subscribed and input by calling party
3=Selected carrier identification code pre-subscribed, no indication of whether input by calling party
4=Selected carrier identification code not pre-subscribed and input by calling party
Carrier Digits (cic):
A 4 digit integer.
Nature of Carrier (noc):
0=No Nature of Carrier Provided
1=Local
2=IntraLATA toll
3=InterLATA
4=Local, intraLATA toll and interLATA
5=Local and intraLATA toll
6=IntraLATA toll and interLATA When the CCE 24 receives an INVITE message from a SIP/H.323 BE, such as the third BE 26c, the CCE 24 populates the Carrier header parameter in the outgoing INVITE with the Carrier parameter provisioned in the CCE 24 for the originating facility or office-wide basis. When the CCE 24 receives the INVITE message from a Network Gateway BE, such as the first BE 26*a*, the CCE 24 will use the Carrier header parameter from a MIME encoded SIP-T message to populate the Carrier header parameter of the outgoing INVITE message.

If the CCE 24 receives a Redirect message from any one of the plurality of ASs 32*a*-32*c* and the CCE 24 determines that the contents of the Redirect message should be forwarded to the NRE 33, the CCE 24 sends the Charge Number header parameter in an outgoing INVITE message to the NRE 33. If the CCE 24 receives a Redirect message from the NRE 33 and the CCE 24 determines that the contents of the Redirect message should be forwarded to the third BE 26*c*, for example, the CCE 24 removes the Charge Number header parameter from the INVITE message, which is generated by the CCE 24 and sends the INVITE message to the third BE 26*c*.

The Charge Party Station Type header parameter (e.g. cpst) contains information about the Calling Party Station, such as whether the calling party station is a pay-phone, hotel phone, etc. The Charge Party Station Type header parameter is also referred to as the Originating Line Information (OLI) within the Integrated Services Digital Network User Part (ISUP) protocol. The Charge Party Station Type header parameter is located in the "From:" header of the INVITE message after the Charge Number-Number Plan header parameter (e.g. cn-np). The Charge Party Station Type header parameter may include one of the following values and corresponding definitions:

0=Identified Line—No Special Treatment
1=ONI (Multiparty)
2=ANI Failure (unavailable)
3=Hotel (without room identification)
4=Coinless, Hospital, Inmate, etc.
5=InterLATA Restricted
6=AIOD—Listed DN sent
7=Identified Line (coin or no coin)
8=Coin call
9=AIN
10=InterLATA restricted—Hotel line
11=InterLATA restricted—Coinless line, etc.
12=Test Call The Collected Address header parameter contains the destination that the Calling or Originating Party wants to connect and its associated parameters, such as Nature of Number and Numbering Plan. In telephony terms, this contains the dialed number or the Collected Address Information. It follows the SIP-Digits format, which closely resembles the format used by ANSI signaling standards. This facilitates inter-working between the SIP-based IP network and the ANSI-based circuit network.

While various features of the present invention are described herein in conjunction with exemplary embodiments having various components using a number of protocols, it should be understood that other suitable components and protocols can be used without departing from the present invention.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto. All references and publications cited herein are expressly incorporated herein by reference in their entirety.

What is claimed is:

1. A non-transitory computer-readable medium having stored thereon a plurality of instructions, the plurality of instructions including instructions which, when executed by a processor, cause the processor to perform a method for communicating between a plurality of network elements to form a multi-media communication path between a first communication device and a second communication device of a plurality of communication devices, comprising:

receiving a session initiation protocol message to form a multi-media communication path between the first communication device in communication with a first private branch exchange and the second communication device in communication with a second private branch exchange, wherein the session initiation protocol message comprises:
 a header region; and
 a plurality of header fields located on the header region, wherein the plurality of header fields includes predetermined address information associated with at least one network element of the plurality of network elements, wherein the header fields are in a session initiation protocol-digits format, where the session initiation protocol-digits format comprises a plurality of header parameters that resembles American national standards institute signaling standard, wherein the plurality of header fields includes to: header field having a collected address header parameter and a carrier identifier code header parameter in the to: header field, wherein the carrier identifier code is for selecting a carrier for a session;

processing the session initiation protocol message; and
transmitting a second message to form the multi-media communication path between the first communication device and the second communication device.

2. The non-transitory computer readable medium of claim 1, wherein the to: header field further includes a collected address-nature of number header parameter.

3. The non-transitory computer readable medium of claim 2, wherein the to: header field further includes a collected address-numbering plan header parameter.

4. The non-transitory computer readable medium of claim 1, wherein the to: header field further includes a carrier selection header parameter.

5. The non-transitory computer readable medium of claim 4, wherein the to: header field includes a nature of carrier header parameter.

6. The non-transitory computer readable medium of claim 1, wherein the plurality of header fields include a from: header field having a charge number header parameter.

7. The non-transitory computer readable medium of claim 6, wherein the from: header field further includes a charge number-nature of number header parameter.

8. The non-transitory computer readable medium of claim 7, wherein the from: header field further includes a charge number numbering plan header parameter.

9. The non-transitory computer readable medium of claim 8, wherein the from: header field further includes a calling party station type header parameter.

10. A method for communicating between a plurality of network elements to form a multi-media communication path between a first communication device and a second communication device of a plurality of communication devices, comprising:

receiving a session initiation protocol message to form a multi-media communication path between the first communication device in communication with a first private branch exchange and the second communication device in communication with a second private branch exchange, wherein the session initiation protocol message comprises:

a header region; and a plurality of header fields located on the header region, wherein the plurality of header fields includes predetermined address information associated with at least one network element of the plurality of network elements, wherein the header fields are in a session initiation protocol-digits format, where the session initiation protocol-digits format comprises a plurality of header parameters that resembles an American national standards institute signaling standard, wherein the plurality of header fields includes a to: header field having a collected address header parameter and a carrier identifier code header parameter in the to: header field, wherein the carrier identifier code is for selecting a carrier for a session;

processing the session initiation protocol message; and transmitting a second message to form the multi-media communication path between the first communication device and the second communication device.

11. The method of claim 10, wherein the to: header field further includes a collected address-nature of number header parameter.

12. The method of claim 11, wherein the to: header field further includes a collected address-numbering plan header parameter.

13. The method of claim 10, wherein the to: header field further includes a carrier selection header parameter.

14. The method of claim 13, wherein the to: header field includes a nature of carrier header parameter.

15. The method of claim 10, wherein the plurality of header fields includes a from: header field having a charge number header parameter.

* * * * *